United States Patent
Cooper et al.

(10) Patent No.: US 8,693,392 B2
(45) Date of Patent: Apr. 8, 2014

(54) PEER-TO-PEER COMMUNICATION SYSTEM AND METHOD

(75) Inventors: Eric Cooper, Kanata (CA); Alan B. Johnston, St. Louis, MO (US); Philip Matthews, Woodlawn (CA)

(73) Assignee: Avaya Canada Corp., Halifax, Nova Scotia (CA)

( * ) Notice: Subject to any disclaimer, the term of this patent is extended or adjusted under 35 U.S.C. 154(b) by 1240 days.

(21) Appl. No.: 11/708,635

(22) Filed: Feb. 21, 2007

(65) Prior Publication Data
US 2008/0198850 A1    Aug. 21, 2008

(51) Int. Cl.
*H04W 4/00*    (2009.01)

(52) U.S. Cl.
USPC .......................................... 370/328; 370/400

(58) Field of Classification Search
USPC ........... 370/352, 400, 401; 709/223, 224, 238
See application file for complete search history.

(56) References Cited

U.S. PATENT DOCUMENTS

| | | | | |
|---|---|---|---|---|
| 7,468,952 B2* | 12/2008 | Takeda et al. | ................. | 370/252 |
| 2004/0064568 A1* | 4/2004 | Arora et al. | ................... | 709/228 |
| 2004/0064693 A1* | 4/2004 | Pabla et al. | ................... | 713/168 |
| 2004/0249970 A1* | 12/2004 | Castro et al. | ................... | 709/238 |
| 2005/0039045 A1* | 2/2005 | Wheeler | ....................... | 713/201 |
| 2005/0240591 A1* | 10/2005 | Marceau et al. | ................... | 707/9 |
| 2005/0243740 A1* | 11/2005 | Chen et al. | ..................... | 370/256 |
| 2006/0087990 A1 | 4/2006 | Kakivaya | | |
| 2006/0191020 A1* | 8/2006 | Miller | .............................. | 726/28 |
| 2006/0239275 A1* | 10/2006 | Zlateff et al. | ................. | 370/400 |
| 2010/0287272 A1* | 11/2010 | Berkey et al. | ................. | 709/223 |

FOREIGN PATENT DOCUMENTS

| | | |
|---|---|---|
| EP | 1659762 A1 | 5/2006 |
| JP | 2006-319384 | 11/2006 |
| WO | WO 2007/041417 A1 | 4/2007 |

OTHER PUBLICATIONS

Weiyu Wu et al: LDHT: Locality-aware Distributed Hash Tables, Department of Electronic Engineering, Tsinghua University, China, 2008.
Jong Won Kim C Park; Efficient overlay network for P2P content sharing based on network identifier, pp. 373-380. Advances in Multimedia Information Processing 2004.

\* cited by examiner

*Primary Examiner* — Jung Park
(74) *Attorney, Agent, or Firm* — Muncy, Geissler, Olds & Lowe, P.C.

(57) ABSTRACT

A method and system of enabling communication between peers in a peer-to-peer (P2P) network in the presence of network address translators (NAT). The method includes: assigning a unique peer identifier to each one of the plurality of peers in the P2P network; establishing an overlay topology connecting each peer to a subset of the plurality of peers in a structured connection pattern based on the unique peer identifier of each peer, each one of the plurality of peers having more connections to close peers and fewer connections to distant peers; and routing messages between peers through the established overlay topology.

17 Claims, 6 Drawing Sheets

PEER-TO-PEER COMMUNICATION SYSTEM AND METHOD

CROSS-REFERENCE TO RELATED APPLICATIONS

This application is related to applicant's co-pending U.S. application, concurrently filed herewith, titled "Bootstrapping in peer-to-peer networks with network address translators", which is hereby expressly incorporated by reference.

FIELD OF THE INVENTION

The present invention relates to the field of facilitating peer-to-peer communication over a network with network address translator presence.

BACKGROUND

Network Address Translation (NAT) causes well-known difficulties for peer-to-peer (P2P) communication since the peers involved in the network may not be reachable at a globally valid IP (Internet Protocol) address.

In particular, current Internet address architecture consists of a global address space (i.e., public IP addresses) and many private address spaces (i.e., private IP addresses) interconnected by NATs. Only peers (also termed nodes, clients, etc.) in the global address space can be easily contacted from anywhere in the network, because they have unique, globally routable IP addresses. Peers on private networks can connect to other peers on the same private network and they can usually open TCP (Transmission Control Protocol) or UDP (User Datagram Protocol) connections to established peers in the global address space. However, the current address architecture makes it difficult for two peers on different private networks to contact each other directly or for a peer in a public network to initiate contact with a peer in a private network. In general, this situation exists because NATs allocate temporary public endpoints for outgoing connections and translate the addresses and port numbers in packets comprising those sessions, while usually blocking all incoming traffic unless otherwise configured.

Many techniques have been proposed to overcome the direct peer-to-peer communication difficulties but they are not typically universally applicable since NAT behavior is not standardized

SUMMARY

Certain exemplary embodiments of the present invention can provide a method of enabling communication between a plurality of peers in a peer-to-peer (P2P) network in the presence of network address translators (NAT), the method comprising: (a) assigning a unique peer identifier to each one of the plurality of peers in the P2P network; (b) establishing an overlay topology connecting each peer to a subset of the plurality of peers in a structured connection pattern based on the unique peer identifier of each peer, each one of the plurality of peers having more connections to close peers and fewer connections to distant peers; and (c) routing messages between peers through the established overlay topology.

Certain exemplary embodiments of the present invention can provide a network overlay topology for enabling communication between a plurality of peers in a peer-to-peer network in the presence of network address translators, the network overlay topology comprising: a unique peer identifier attributable to each one of the plurality of peers in the P2P network; and an overlay topology connecting each peer to a subset of the plurality of peers in a structured connection pattern based on the unique peer identifier of each peer, each one of the plurality of peers having more connections to close peers and fewer connections to distant peers, the structured connection pattern being arranged to enable message routing between peers through the established overlay topology.

DETAILED DESCRIPTION

Figure 1:
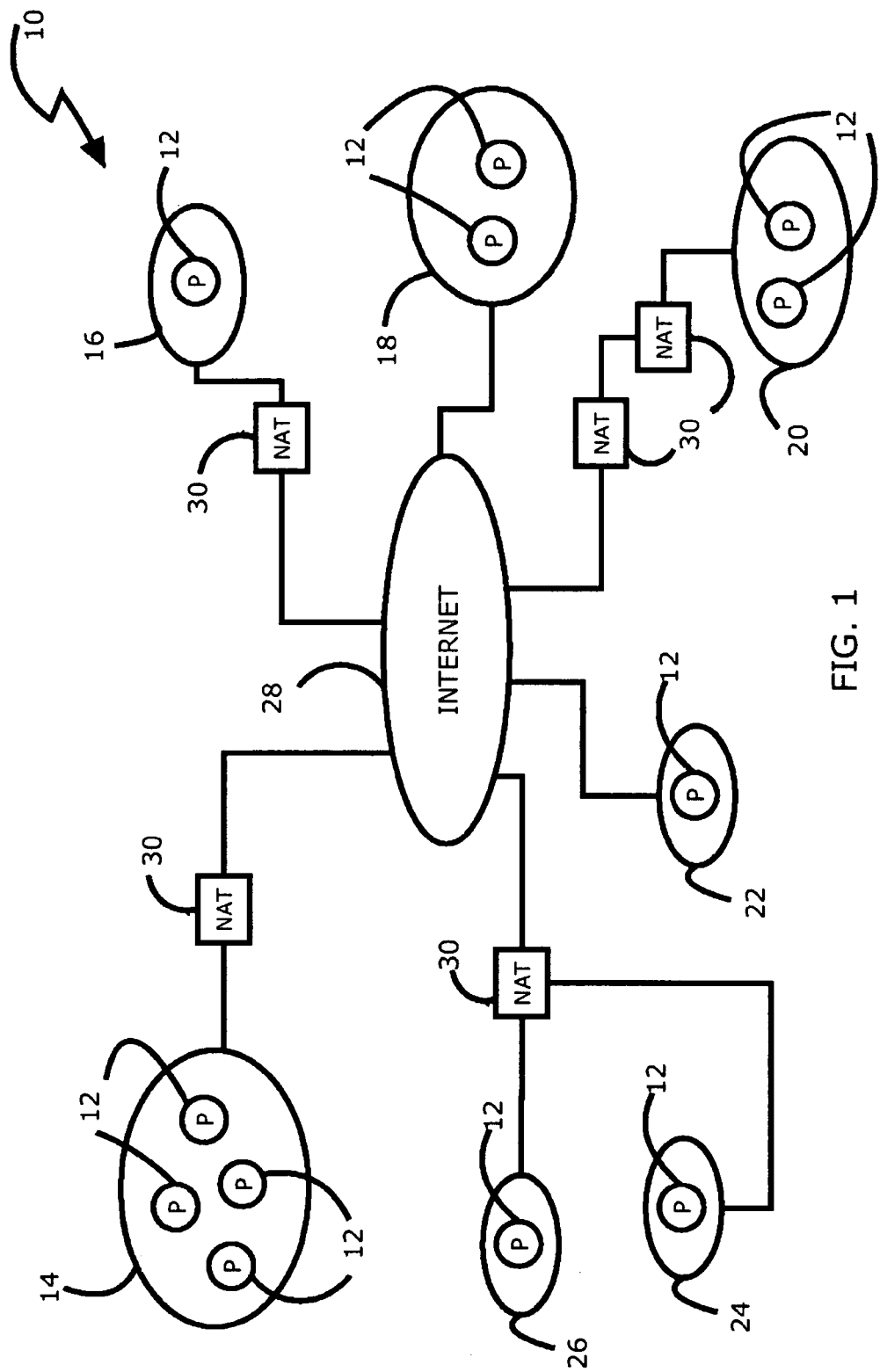
FIG. 1 illustrates a schematic representation of a peer-to-peer network having a plurality of peers to be structured in an overlay topology according to embodiments of the present invention.

FIG. 1 illustrates a network topology 10 including a representative group of peers 12 that are to be structured in a P2P overlay topology (simply referred to as an overlay).

An overlay is effectively a network that is built on top of another network. Nodes/peers in the overlay are connected using virtual or logical links, each of which corresponds to a path, typically through many physical links, in the underlying network.

The network topology 10 of FIG. 1 includes a series of subnets (sub-networks) 14, 16, 18, 20, 22, 24 and 26, each containing one or more peers 12, and the Internet 28. Subnets 18 and 22 use public IP addresses since they are part of the global address space. Subnets 14, 16, 20, 24 and 26 use private IP addresses since NATs (Network Address Translator) 30 are located between the respective subnet and the Internet 28. Subnets 24 and 26 share a single NAT 30. Subnet 20 illustrates a cascading NAT arrangement where two NATs 30 are located between the subnet 20 and the Internet 28.

Establishing connections between peers in a network through NATs is commonly referred to as NAT traversal. A number of known NAT traversal protocols based on NAT behavior include: Simple Traversal of UDP over NATs (STUN); Traversal Using Relay NAT (TURN); Session Border Controller (SBC); and UDP hole punching. A number of known NAT traversal protocols based on NAT control include: Realm-Specific IP (RSIP); NAT Port Mapping Protocol; and Universal Plug and Play (UPnP). A NAT traversal protocol combining several different protocols is called Interactive Connectivity Establishment (ICE).

Figure 2:
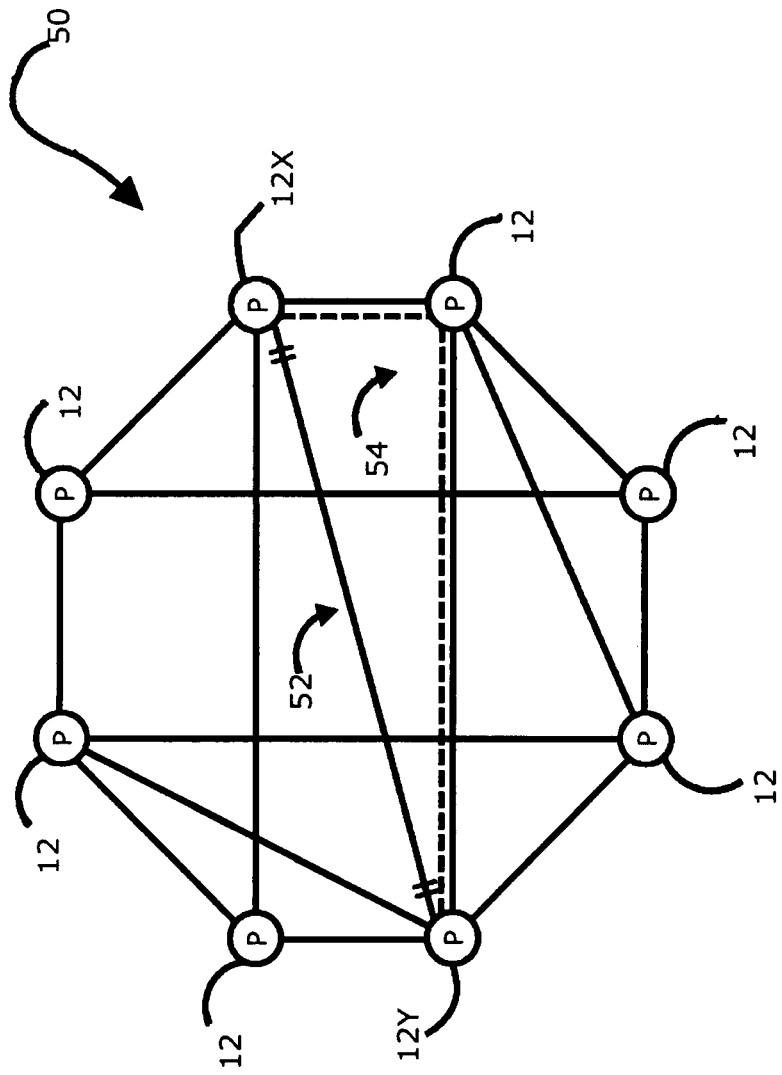
FIG. 2 illustrates a schematic representation of a partial mesh overlay topology according to an embodiment of the present invention.

Embodiments of the present invention describe various overlays and associated methods for facilitating communication between peers Partial Mesh Overlay/Connections FIG. 2 illustrates a representative partial mesh overlay 50 where, in this example, each peer 12 is located behind a NAT (not illustrated) having restrictive filtering policies. In general, each peer 12 in overlay 50 establishes connections (shown in solid lines) to some of the other peers 12 to establish a partial mesh of connections between the peers 12. Having created the partial mesh overlay 50, peers 12 may then route messages using the established connections. Once established, a connection is maintained for as long as it is desired by at least one peer. Maintaining a connection typically requires that some messages be periodically exchanged.

The partial mesh overlay 50 strikes a balance between a ring overlay where each peer is connected only to two neighbor peers and a full mesh overlay where all pairs of peers are connected while still allowing messages to be delivered across NATs.

Connections need to be added to and removed from the overlay 50 from time to time as peers join and leave the network. Adding a new connection typically requires that the signaling for the new connection be routed along existing connections. For example, referring to FIG. 2, peer 12X wants to setup a connection to peer 12Y. Since peer 12Y is behind a NAT 30 with a restrictive filtering policy, peer 12X cannot send a connection request directly to peer 12Y (line 52). To address this restriction, peer 12X sends the connection request (dotted lines 54) through existing connections in the overlay 50. After the connection request is delivered to peer 12Y, peer 12X and 12Y use standard NAT traversal techniques to initiate and maintain a connection.

A generalized overlay topology uses a minimum set of connections to ensure that messages can be transmitted between any arbitrary pair of peers. The specific number of connections used is based on the type of mechanism used for routing messages between peers in the network. Generally, when more connections are present, routing can be performed with fewer hops. However, each connection consumes resources (such as memory, computing cycles on the peer itself, bandwidth on the underlying network, etc.) so minimizing the number of connections without degrading routing efficiency is a factor in overlay design.

In addition to the connections created based on a routing design, further connections may be useful for application-specific purposes. For example, the connections represented by the solid lines in FIG. 2 may be created to ensure that it is both possible and reasonably efficient to route messages between any arbitrary pair of peers in the network 50. However, if peers 12X and 12Y need to exchange a large volume of messages or need to exchange messages at regular/frequent intervals it may be beneficial to add the new connection 52 to optimize those exchanges.

Representative Peer

Figure 3:
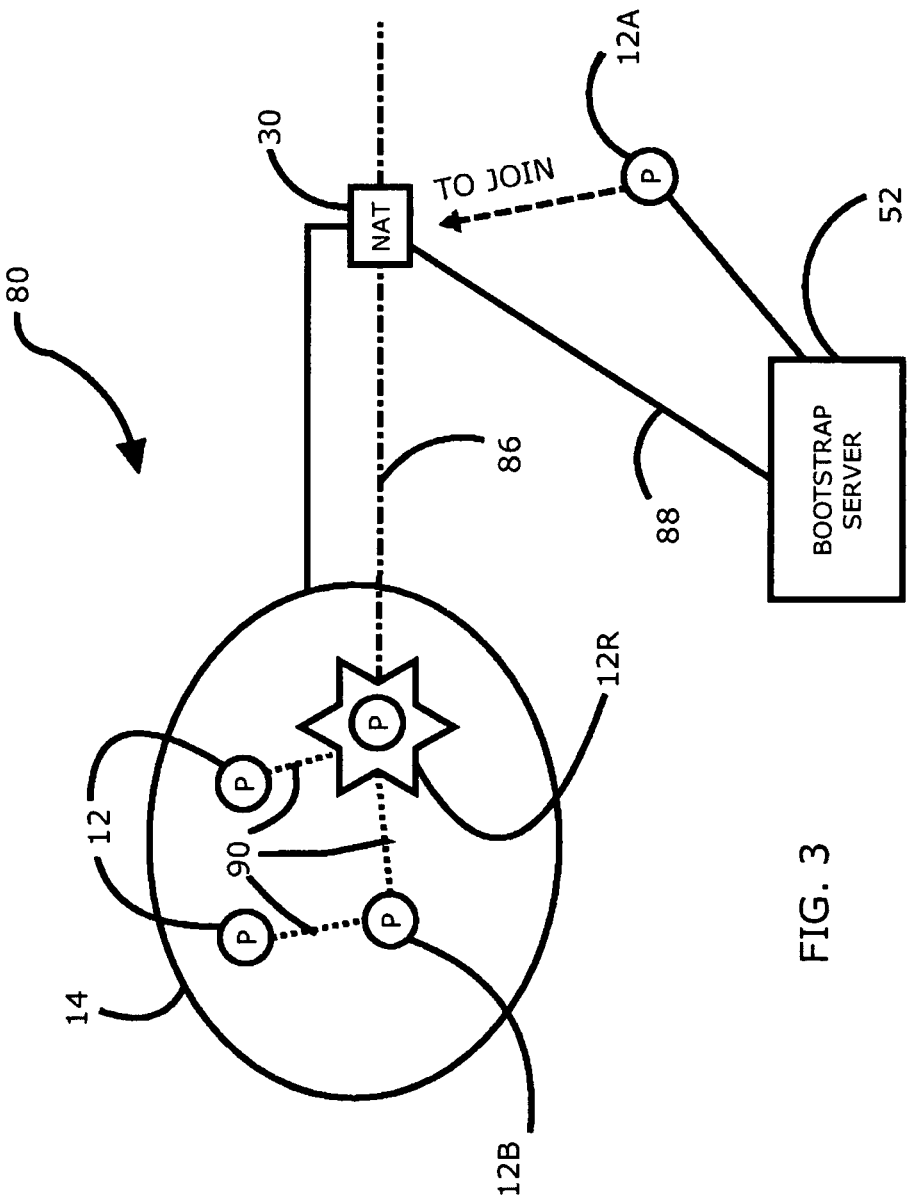
FIG. 3 illustrates a schematic representation of a portion of the network of FIG. 1 to illustrate a peer admission process according to an embodiment of the present invention.

FIG. 3 illustrates an example arrangement 80 of subnet 14 of FIG. 1. The subnet 14 includes a group of peers 12 that are all located behind the NAT 30. In this type of topology, one or more of the peers 12 in the subnet 14 can be "elected" or "designated" as a representative peer 12R to act on behalf of the other peers 12 in the subnet 14.

The arrangement 80 creates two types of connections: (1) connections between the representative peer 12R that traverse the NAT 30 (refer to dotted line 86) and (2) connections between the representative peer 12R and the local peers 12 within the subnet 14 that do not traverse the NAT 30 (refer to dotted lines 90).

Structured Message Routing/Symmetric Interest

A structured scheme creates a connection pattern that can be exploited in routing. For example, structured message routing can be based on "converting" a DHT (Distributed Hash Table) lookup scheme into a routing algorithm. In particular, a DHT scheme for looking up an item of data is viewed as a scheme of routing to the peer that holds the data. If routing is based on the peer identifier of a node being searched then the process can be considered as a routing algorithm.

More specifically, given a pattern of connections (as discussed with reference to FIG. 2) various patterns of those connections are possible. The overlay 50 allows a peer 12 to place a call to another peer 12, to publish that status of a peer (or user), and to create a connection to another peer in the overlay 50. A structured scheme enables the connection pattern between peers 12 to be exploited when routing messages between peers.

The basic structure of the connection topology should support the routing mechanism of the overlay 50. For example, a DHT can be used as a basis for a structured scheme by assigning a unique identifier to each peer (e.g., based on attributes of a peer: network address, manufacturer's serial number, MAC (Media Access Control) address, etc.). The attributes of the peer are commonly "hashed" using 1-way hash functions (such as MD5 [Message-Digest algorithm 5], SHA-1 [Secure Hash Algorithm]) to create the unique peer identifier.

In one example, the unique peer identifier can be used to place peers on a conceptual/virtual ring. Each peer then maintains connections to peers located at various locations going clockwise around the ring. In this structured connection scheme, a message to a peer (Q) can be addressed to its location in the ring and an intermediate peer (1) can forward the message to a peer (S) in the intermediate peer's (I) connection table that is closest to peer (Q).

A DHT-based connection topology is created to distribute the effort required to index and locate resources in the network. For a VoIP (Voice Over IP) communication overlay network, the peers are generally telephones or telephony applications running on computers and the resources are generally people that wish to communicate with each other. Each resource in the system is normally assigned one or more identifiers (e.g., a phone number or an address-of-record). A DHT-based overlay network can effectively "re-use" the same 1-way hash function that was used to create the unique peer identifier (as discussed above) to construct a unique resource identifier. Each peer 12 in the overlay 50 then assumes a portion of the responsibility for storing information about the available resources. For example, in a Chord-based DHT overlay, a peer is responsible for maintaining information about the resources whose resource identifier is closest to, but does not exceed its peer identifier. Therefore, if the hash of a user's address-of-record were X, contact and status information for that user would be stored by the peer whose peer identifier was closest to, but did not exceed X.

In addition to the routing structure employed by the overlay network 50, a further consideration when establishing connection topologies is a property referred to as symmetric interest. A connection scheme exhibits symmetric interest if, when a peer 12X desires a connection to another peer 12Y, then peer 12Y also desires a connection to peer 12X. Symmetric interest is a useful property of connection schemes since connections through NATs 30 are bi-directional and because both peers 12X and 12Y incur overhead of sending messages to establish and maintain a connection.

Figure 4:
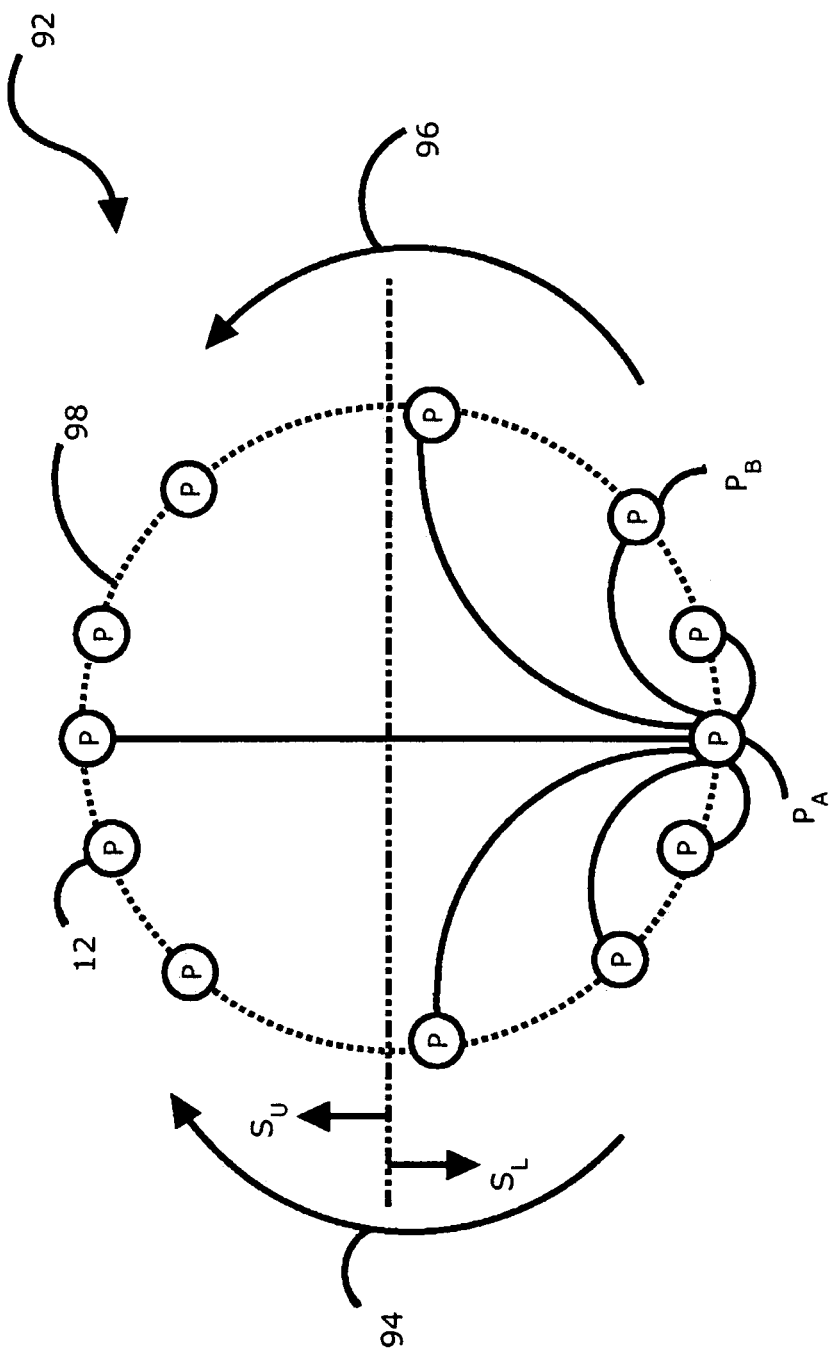
FIG. 4 illustrates a schematic representation of an overlay topology having a structured connection pattern according to an embodiment of the present invention.

Referring to FIG. 4, a structured connection pattern 92 is illustrated that exhibits symmetric interest since each peer 12 maintains connections to the peers 12 located at exponentially increasing distances arranged in both a clockwise 94 and a counter-clockwise 96 arrangement around a virtual ring 98. In particular, pattern 92 depicts a connection topology from the perspective of a single node (i.e., peer $P_A$). Assuming the peer identifier for $P_A$ is 0, a hash table may contain addresses for peers with identifiers: $2^0, 2^1, 2^2, \ldots, 2^{n/2}, \ldots, 2^{n-2}, 2^{n-1}$. In this type of arrangement peer $P_A$ would include peer $P_B$ in its connection table, thereby, exhibiting symmetric interest.

Each peer has more connections to "close" peers and fewer connections to "distant" peers when connections between peers are established in this manner. The terms "close" and "distant" are based on the unique peer identifiers assigned by the overlay network (as discussed above) and do not necessarily reflect geographic, physical proximity or physical network hop counts. From the view point of one peer (i.e., peer $P_A$), the structured connection pattern 92 schematically illustrates symmetric interest by the fact that more connections are present in a lower semi-circle $S_L$ and fewer connections are present in an upper semi-circle $S_U$ of the ring 98.

Joining the Network

Figure 5:
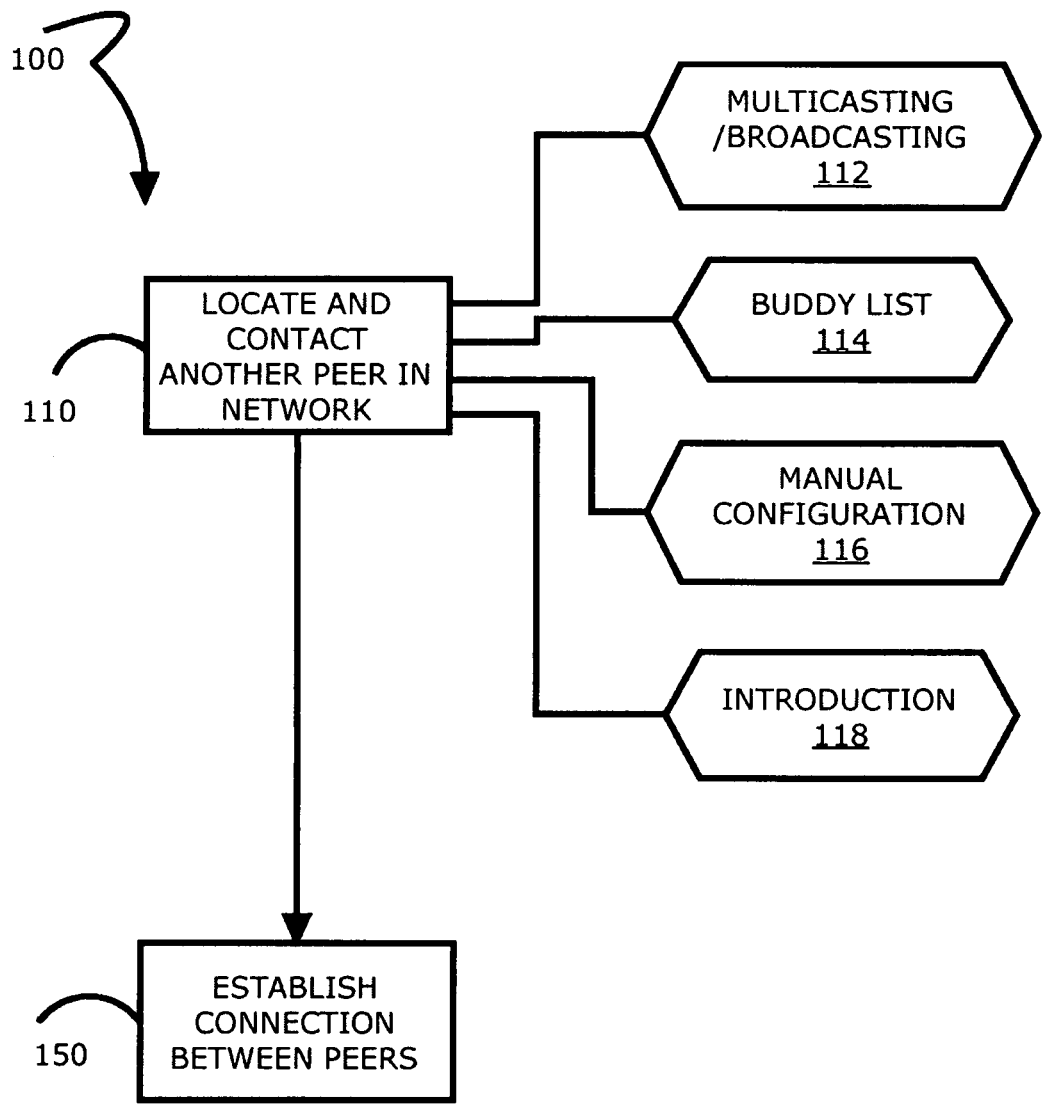
FIG. 5 illustrates a flow chart representing a process of adding a new peer to a network according to an embodiment of the present invention.

Referring to FIG. 3, peer 12A is initially not part of the overall network. A process 100 of enabling the peer 12A to join the network will be described with reference to the flow chart of FIG. 5.

Step 110: Locate and contact another peer (designated as peer 12B-see FIG. 3) in the network. Peer 12A can accomplish location and contact with another peer using multicasting or broadcasting 112, buddy lists 114, manual configuration 116 and introduction 118. These approaches will be described in further detail below.

Step 150: Establish a connection between peer 12A and the located other peer 12B using a NAT traversal protocol.

In multicasting/broadcasting 112, peer 12A would transmit a "hello, is anyone there?" multicast/broadcast message and any peer (i.e., peer 12B) currently in the overlay network can reply. The reply will contain information to allow peer 12A to contact one (or more) of the other peers and request admission to the overlay. Alternatively, peers 12 (including peer 12B) that are currently in the network can periodically send out multicast/broadcast messages advertising (i.e., an advertising message) their existence, which would allow peer 12A to discover other peers by listening for multicast/broadcast messages. The advertising message would also contain information to allow peer 12A to contact one (or more) of the other peers and request admission to the overlay.

Buddy lists 114 can be used if peer 12A was previously part of the network but was disconnected for a period of time (e.g., a VoIP phone was removed from the network or shut down). Peer 12A can be configured to remember the address and port information of some peers 12 when it disconnects and then attempts to contact the peers 12 on its buddy list when it wants to rejoin the network. The peer 12A will be able to rejoin the network if at least one of the other peers 12 can be contacted and is still a member of the network.

The manual configuration method 116 involves configuring the peer 12A with address and port information of one of the other peers 12 in the network. The address and port information represents the public IP address and port of a peer 12 that the NAT 30 (if any) assigns. If the peer 12A is behind the NAT 30 with a filtering behavior (address restricted) then the peer 12A is also configured with the address and port information of the peer 12B, for example.

The introduction method 118 involves the use of a bootstrap server 52 (see FIG. 3) that represents a node with a public IP address and, optionally, a DNS (Domain Name System) entry. The bootstrap server 52 need not be part of the network per se but is used for introduction/bootstrapping of new peers in the network. For example, the subnet 14 may elect/designate one of the peers in the network (such as peer 12B or 12R) to maintain a connection 88 to the server 52.

When peer 12A contacts the server 52, peer 12A is given the address and port information (i.e., mapped IP address) of the elected peer and the server 52 forwards the address and port information of the peer 12A to the selected peer to enable admission to the overlay.

Peer-to-Peer Communication

Figure 6:
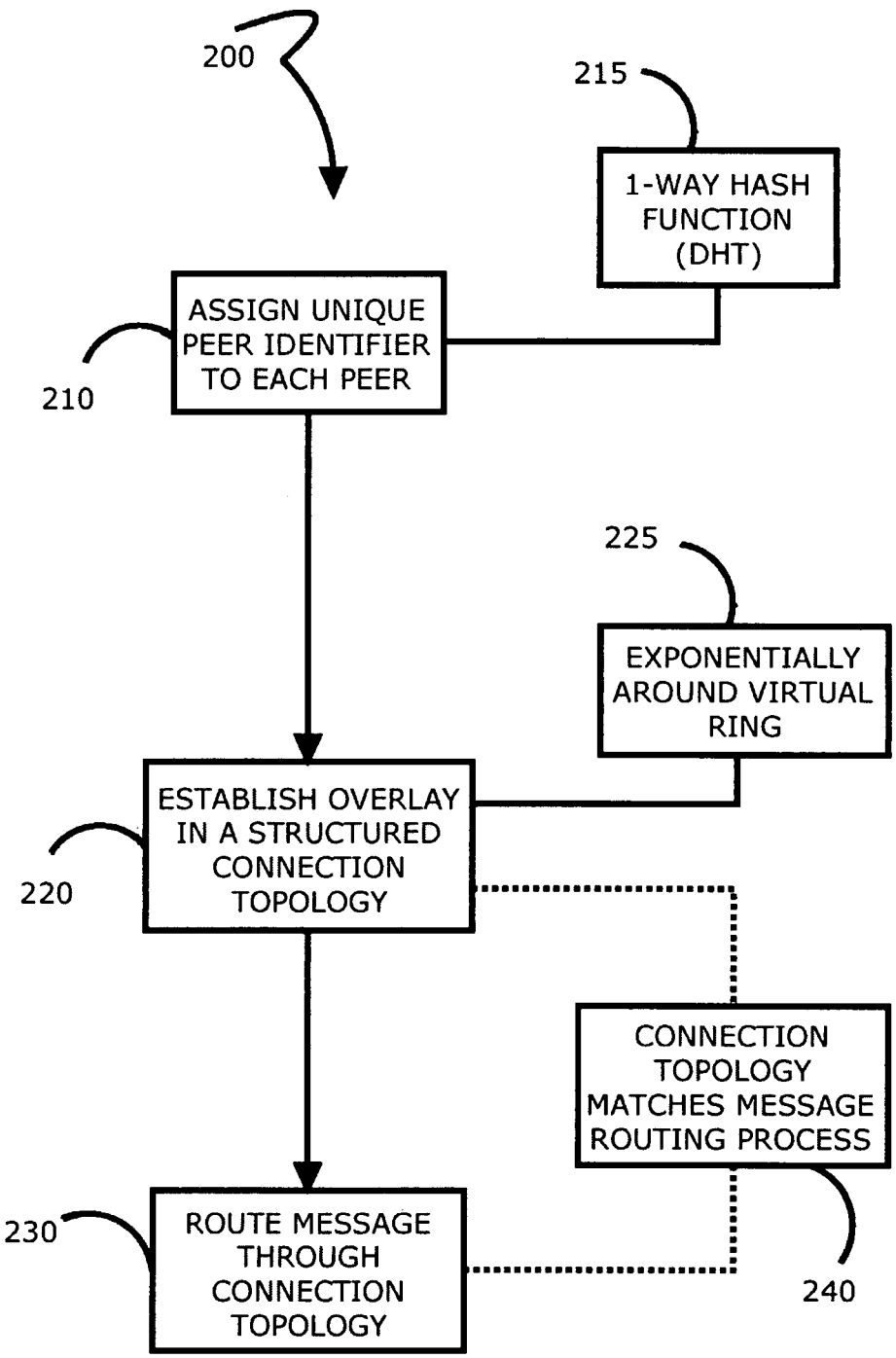
FIG. 6 illustrates a flow chart representing a process of enabling communication between peers in a network according to an embodiment of the present invention.

FIG. 6 is a flow chart illustrating a method 200 of enabling communication between peers in a peer-to-peer (P2P) network in the presence of network address translators (NAT) according to an embodiment of the present invention. The method 200 includes:

Step 210: assign a unique peer identifier to each one of the plurality of peers in the P2P network using, for example, a 1-way has function 215.

Step 220: establish an overlay topology connecting each peer to a subset of the plurality of peers in a structured connection pattern based on the unique peer identifier of each peer, each one of the plurality of peers having more connections to close peers and fewer connections to distant peers (such as at exponentially increasing distances going both clockwise and counter-clockwise around a virtual ring 225).

Step 230: route messages through the established overlay topology (i.e., the connection topology matches message routing processes/algorithms 240).

The invention claimed is:

1. A method of enabling communication between a plurality of peers in a peer-to-peer (P2P) network in the presence of network address translators (NAT), the method comprising:
   (a) assigning a unique peer identifier to each one of the plurality of peers in the P2P network;
   (b) establishing an overlay topology connecting each peer to a respective subset of the plurality of peers in a structured connection pattern based on the unique peer identifier of each peer, wherein the structured connection pattern includes, for each peer of the plurality of peers, more connections to close peers and fewer connections to distant peers, wherein "close" and "distant" do not necessarily reflect geographic, physical proximity or physical network hop count and are based on differences between the peers' respective unique peer identifiers; and
   (c) routing messages between peers through the established overlay topology.

2. The method of claim 1, wherein a plurality of the unique identifiers are on a virtual ring, and wherein step (b) includes: establishing connections between peers at exponentially increasing distances in a clockwise and a counter-clockwise direction about the virtual ring.

3. The method of claim 1, wherein step (a) includes:
   hashing an attribute of each one of the plurality of peers using a 1-way hash function to generate the unique peer identifier, wherein the attribute includes one of: a network address, a MAC (Media Access Control) address, and a serial number.

4. The method of claim 1, wherein connections established in the structured connection pattern are maintained during connection request signaling between a pair of peers from the plurality of peers and during message signaling between the pair of peers.

5. The method of claim 4, further comprising establishing a NAT traversal protocol between the pair peers after connection request signaling.

6. The method of claim 1, further comprising establishing a further connection, not part of the connections established in the structured connection pattern, between a pair of peers from the plurality of peers, which established communication during connection request signaling.

7. The method of claim 1, further comprising adding a new peer in the P2P network; wherein the step of adding a new peer includes:
   (i) locating and contacting one of the plurality of peers in the P2P network; and
   (ii) establishing a connection between the new peer and the one of the plurality of peers in the P2P network.

8. The method of claim 7, wherein step (i) includes:
   transmitting a message to the plurality of peers in the P2P network;
   receiving a reply message from at least one peer of the plurality of peers designated as a target peer; and
   requesting admission to the overlay topology based on information contained in the reply message from the target peer.

9. The method of claim 7, wherein step (i) includes:
   receiving a periodically advertised message sent from the plurality of peers; and
   requesting admission to the overlay topology based on information contained in the advertised message from one of the plurality of peers sending the advertised message.

10. The method of claim 7, wherein step (i) includes:
    storing address and port information of a subset of peers from the plurality of peers based on previous connections with the new peer; and
    requesting admission to the overlay topology by initiating communication with one of the subset of peers.

11. The method of claim 7, wherein step (i) includes:
    configuring the new peer with address and port information of one of the plurality of peers in the P2P network designated as a target peer; and
    requesting admission to the overlay topology by initiating communication with the target peer.

12. The method of claim 7, wherein step (i) includes:
    electing a target peer selected from the plurality of peers in the P2P network to maintain a connection to a server;
    contacting the server to obtain address and port information of the target peer selected from the plurality of peers in the P2P network; and
    requesting admission to the overlay topology by initiating communication with the target peer.

13. The method of claim 1, wherein establishing an overlay topology comprises providing physical connections between each peer and a subset of the plurality of peers in accordance with the structured connection pattern.

14. A network overlay topology for enabling communication between a plurality of peers in a peer-to-peer network in the presence of network address translators, the network overlay topology comprising:
    a unique peer identifier attributable to each one of the plurality of peers in the P2P network; and
    an overlay topology comprising physical links connecting each peer to a subset of the plurality of peers in a structured connection pattern based on the unique peer identifier of each peer, wherein the structured connection pattern includes, for each peer of the plurality of peers, more connections to close peers and fewer connections to distant peers, wherein "close" and "distant" do not necessarily reflect geographic, physical proximity or physical network hop count and are based on differences between the peers' respective unique peer identifiers, the structured connection pattern being arranged to enable message routing between peers through the established overlay topology.

15. The system of claim 14, wherein a plurality of the unique identifiers are on a virtual ring, and wherein the overlay topology includes connections between peers located at exponentially increasing distances in a clockwise and a counter-clockwise direction about the virtual ring.

16. The system of claim 15, further comprising:
    means for coding an attribute of each one of the plurality of peers to generate the unique peer identifier, wherein the attribute includes one of: a network address, a MAC (Media Access Control) address, and a serial number.

17. A method of enabling communication between a plurality of peers in a peer-to-peer (P2P) network in the presence of network address translators (NAT), the method comprising:
    providing a network comprising a plurality of peers, the network including at least one network address translator (NAT) and physical network links between at least some of the plurality of peers;
    assigning a unique peer identifier to each one of the plurality of peers;
    establishing an overlay topology including physical links connecting each peer to a subset of the plurality of peers in a structured connection pattern based on the unique peer identifier of each peer, wherein the structured connection pattern includes, for each peer of the plurality of peers, more connections to close peers and fewer connections to distant peers, wherein "close" and "distant" do not necessarily reflect geographic, physical proximity or physical network hop count and are based on differences between the peers' respective unique peer identifiers; and
    routing messages from at least one peer of the plurality of peers to at least one other peer of the plurality of peers through the physical network links of the established overlay topology.

* * * * *